United States Patent

Niskin

[15] 3,688,433
[45] Sept. 5, 1972

[54] NET FOR COLLECTING MARINE SPECIMENS

[72] Inventor: Shale J. Niskin, 9400 S.W. 63 Court, Miami, Fla. 33143

[22] Filed: June 6, 1969

[21] Appl. No.: 830,951

[52] U.S. Cl............................................43/100, 43/7
[51] Int. Cl........................A01k 69/00, A01k 71/00
[58] Field of Search............43/4, 7, 9, 100, 102, 103, 43/65, 1

[56] References Cited

UNITED STATES PATENTS

| 59,429 | 11/1866 | Maxwell | 43/103 |
| 535,966 | 3/1895 | Tufts | 43/65 |
| 1,803,928 | 5/1931 | Vigneron | 43/9 |
| 2,767,501 | 10/1956 | Bjorksten | 43/7 |

FOREIGN PATENTS OR APPLICATIONS

| 357,169 | 10/1905 | France | 43/100 |

*Primary Examiner*—Warner H. Camp
*Attorney*—Lloyd J. Andres

[57] ABSTRACT

A conical net for collecting marine specimens having a predetermined divergent conical arcuate angle with a collar at the opening thereof shaped at a larger acute divergent angle and attached to a bridle terminating in a junction for retention by a line. The net is normally rolled into a generally cylindrical form for storage and self opening when submerged by the line in a current of water.

2 Claims, 6 Drawing Figures

PATENTED SEP 5 1972 3,688,433
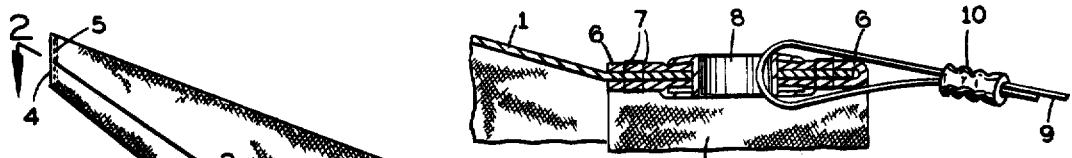
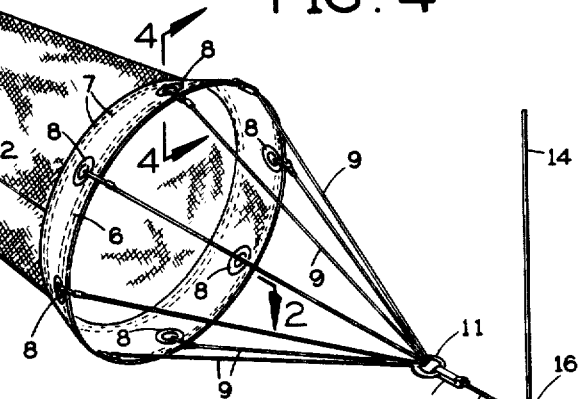
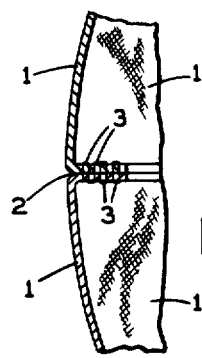
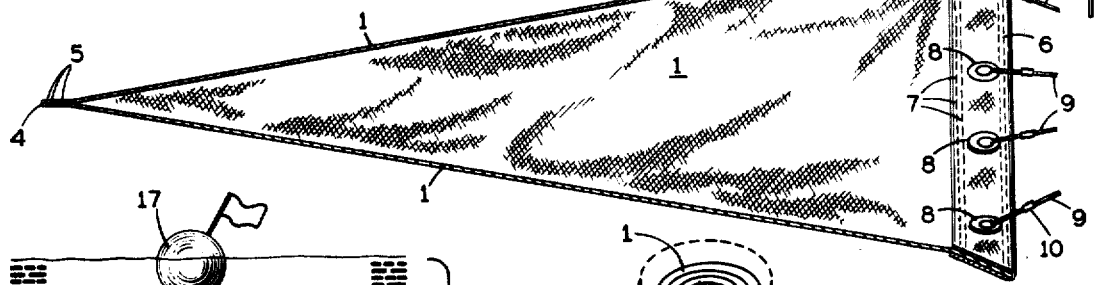
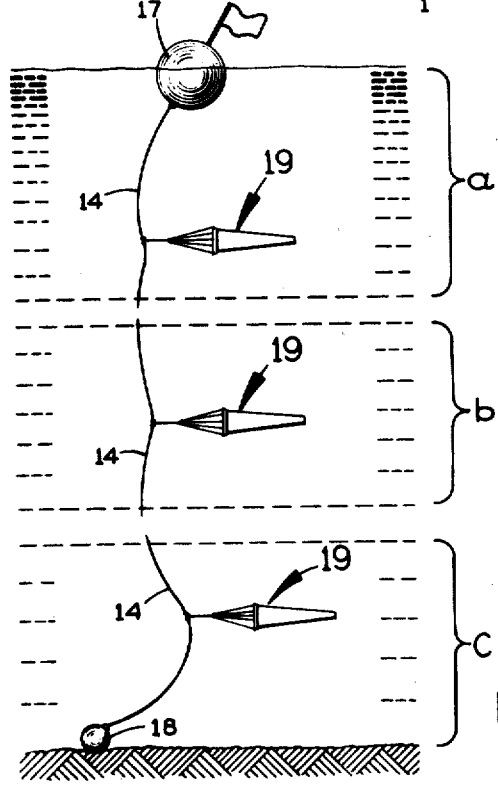
INVENTOR.
SHALE J. NISKIN

NET FOR COLLECTING MARINE SPECIMENS

This invention relates in general to an apparatus for obtaining specimens for oceanography study and more particularly to a net of predetermined mesh size formed in a general shape of a cone with the opening thereof secured to a line by a bridle.

A principal object of the invention is the provision of a conical net having a wide range of mesh size and of a predetermined divergent angle secured to a collar having a predetermined larger acute divergent angle than the net and fabric made from dense flexible or other sheet material and secured to a line by a bridle comprising a plurality of shrouds connected to the collar in spaced marginal peripheral relation with the opposite ends thereof terminating in a common toe connection.

A further object of the invention is the provision of a conical net having a self opening collar secured to the open end thereof and a bridle secured to the outer end of the collar whereby the entire net assembly may be rolled into a generally cylindrical form for storage with the collar flatly positioned along the outer side thereof for automatically expanding by water force and opening and unrolling the net when released in a current of water.

These and other objects and advantages in one embodiment of the invention are described and shown in the following specification and drawing, in which:

FIG. 1 is a perspective view of the specimen net as submerged in operating position.

FIG. 2 is a sectional view taken along line 2—2 of FIG. 1.

FIG. 3 is a sectional view taken along line 3—3 of FIG. 1 and showing the closure seam along the length of the net.

FIG. 4 is an enlarged cross sectional view taken through section line 4—4, FIG. 1.

FIG. 5 shows the net shown in FIG. 1 in rolled, storage position with the bridle thereof broken away.

FIG. 6 Illustrates a plurality of the nets shown in FIG. 1 secured in spaced relation along a common line retained by a float for obtaining marine specimens at different depths in a body of water.

Referring to FIGS. 1, 2, and 3, a conical net 1, in this embodiment, is formed from predetermined relatively fine mesh of reticulated sheet net material of natural or synthetic variety by having a longitudinal seam 2 formed by sewing two marginal portions of the opposite sides of the fabric by sewing 3, as illustrated in FIG. 3.

Referring to FIGS. 1 and 2, the apex 4 of the conical net is flattened and retained by sewing 5 across the end thereof, as shown.

A conical collar 6, made from dense flexible sheet material, such as multi-layer fabric, is conically formed at a predetermined greater acute conical angle than that of net 1 with a small diameter sewed to the open end of the net 1, as shown by character 7, in FIGS. 1 and 4. The collar 6 is provided with a plurality of equispaced grommets 8 secured through the periphery thereof, as shown. One end of each shroud 9 is looped through each grommet and secured by a well known compression fastener 10. The opposite end of each shroud is secured to a ring 11, also by well known means. A snap fastener 12 is secured to one end of a lead line 13 and the opposite end thereof retained to a drag line 14 by an eyelet 15 rotationally retained by a swivel about the drag line by spaced squeeze-type stops 16—16.

FIG. 6 illustrates the drag line 14 suspended in a body of water by a float 17 with the opposite end of the line secured to a weight 18 which may or may not rest at the bottom of the body of water. This figure illustrates three net assemblies 19 for obtaining marine specimens at predetermined depths in three zones, $a$, $b$, and $c$, respectively.

FIG. 5 illustrates one of the net assemblies 19 rolled in generally cylindrical form with the opening of the collar along one side of the roll with the shrouds broken away for clarity. The broken line illustrates a container 20 for storing the rolled net prior to use.

In operation, the coiled net may be released in the water and a small flow thereof with respect to the net will engage the inner surface of the collar and force the opening thereof followed by the opening of the entire net as it uncoils into generally conical entrapment shape.

This invention comprehends modifications in construction within the features and spirit of the above specifications.

Having described my invention, I claim:

1. A flexible net for entrapping and collecting marine specimens from a body of water comprising an elongated conical open mouth net having a predetermined acute included angle and formed from flexible material of uniform predetermined thickness and mesh size, a flexible conical collar member having the small diameter thereof mated with and secured to the outer edge of said mouth of said net with the predetermined included angle greater than the included angle of said net, bridle means comprising a plurality of shrouds with the inner ends thereof secured at spaced intervals around the outer peripheral margin of said collar member with the outer ends thereof secured to a common junction for engagement with a drag line whereby the immersion of said net and collar member in a body of water and the relative flow of said water with respect to said collar member will impinge against the inner surface thereof and force and hold said collar member and said net into conical entrapment shape.

2. The construction recited in claim 1 wherein said net and said collar member may be flattened and rolled from the apex end of said net toward said collar member and said bridle means into a substantially cylindrical body for compact storage.

* * * * *